(12) United States Patent
Li

(10) Patent No.: US 9,748,854 B2
(45) Date of Patent: Aug. 29, 2017

(54) ALTERNATING CURRENT (AC)-DIRECT CURRENT (DC) CONVERSION CIRCUIT AND CONTROL METHOD THEREOF

(71) Applicant: SHENZHEN BOYN ELECTRIC CO., LTD., Shenzhen, Guangdong (CN)

(72) Inventor: Lunquan Li, Guangdong (CN)

(73) Assignee: SHENZHEN BOYN ELECTRIC CO., LTD., Shenzhen, Guangdong (CN)

(*) Notice: Subject to any disclaimer, the term of this patent is extended or adjusted under 35 U.S.C. 154(b) by 0 days.

(21) Appl. No.: 15/202,576

(22) Filed: Jul. 6, 2016

(65) Prior Publication Data

US 2016/0315547 A1    Oct. 27, 2016

Related U.S. Application Data

(63) Continuation of application No. PCT/CN2015/070808, filed on Jan. 15, 2015.

(30) Foreign Application Priority Data

Jan. 16, 2014    (CN) .......................... 2014 1 0021284

(51) Int. Cl.
   *H02M 3/335*    (2006.01)
   *H02M 1/42*    (2007.01)
   (Continued)

(52) U.S. Cl.
   CPC ..... *H02M 3/33569* (2013.01); *H02M 1/4216* (2013.01); *H02M 1/4258* (2013.01);
   (Continued)

(58) Field of Classification Search
   CPC ......... H02M 2001/0032; H02M 3/156; H02M 2001/0025; H02M 3/33507;
   (Continued)

(56) References Cited

U.S. PATENT DOCUMENTS 5,045,989 A    9/1991    Higaki et al.
5,568,368 A *  10/1996   Steigerwald .............. H02J 3/38
                                                         363/132

(Continued)

FOREIGN PATENT DOCUMENTS

CN    101728961 A    6/2010
CN    102510610 A    6/2012
   (Continued)

OTHER PUBLICATIONS

Gu Haiyuan, "Analog Electronic Technologies", Science Press, Aug. 2004, cover page and pp. 28-29.

*Primary Examiner* — Adolf Berhane
*Assistant Examiner* — Henry Lee, III
(74) *Attorney, Agent, or Firm* — Winston Hsu

(57) ABSTRACT

An AC-DC conversion circuit includes an input rectifier circuit, a primary side input filtering capacitor, a primary side inverter circuit, a drive circuit, an isolation transformer, a secondary side rectifier circuit, a secondary side capacitors, and a control circuit connected between the secondary side output filtering capacitor and the drive circuit, where the drive circuit is connected to the primary side inverter circuit. The primary side inverter circuit and the primary side input filtering capacitor form a loop, so as to form a clamping resonant circuit. Inverter switching transistors operate in a zero voltage switching (ZVS) state. The secondary side rectifier circuit has two operation modes including a forward operation mode and a flyback operation mode. Each of the first and the second inverter switching transistors in the primary side inverter circuit is used as an inverter switching transistor or a clamping switching transistor according to an operation period.

10 Claims, 4 Drawing Sheets

(51) Int. Cl.
*H02M 3/337* (2006.01)
*H02M 7/217* (2006.01)
*H02M 1/00* (2006.01)

(52) U.S. Cl.
CPC ........... *H02M 3/337* (2013.01); *H02M 7/217* (2013.01); *H02M 2001/0058* (2013.01); *Y02B 70/126* (2013.01); *Y02B 70/1433* (2013.01); *Y02B 70/1441* (2013.01); *Y02B 70/1491* (2013.01)

(58) Field of Classification Search
CPC ......... H02M 3/33523; H02M 3/33584; H02M 2001/007; H02M 3/1588; H02M 1/14; H02M 1/15; H02M 2001/0048; H02M 3/3378; H02M 2003/1566
See application file for complete search history.

(56) References Cited

U.S. PATENT DOCUMENTS

| | | | |
|---|---|---|---|
| 7,375,994 B2 | 5/2008 | Andreycak | |
| 7,466,567 B2 | 12/2008 | Yang | |
| 2007/0236963 A1* | 10/2007 | Yasumura | H02M 1/4241 363/16 |
| 2008/0298087 A1* | 12/2008 | Mozipo | H02M 7/53873 363/17 |
| 2009/0080222 A1* | 3/2009 | Popescu | H02M 1/44 363/20 |
| 2010/0026208 A1* | 2/2010 | Shteynberg | H05B 33/0815 315/297 |
| 2011/0101775 A1* | 5/2011 | Busch | H02J 9/005 307/18 |
| 2014/0140114 A1* | 5/2014 | Shoji | H02M 7/53871 363/89 |

FOREIGN PATENT DOCUMENTS

| | | |
|---|---|---|
| CN | 102891608 A | 1/2013 |
| CN | 103001501 A | 3/2013 |
| CN | 103219890 A | 7/2013 |
| CN | 103812359 A | 5/2014 |
| CN | 203722491 U | 7/2014 |
| JP | 10271831 | 10/1998 |

* cited by examiner

US 9,748,854 B2

ALTERNATING CURRENT (AC)-DIRECT CURRENT (DC) CONVERSION CIRCUIT AND CONTROL METHOD THEREOF

CROSS REFERENCE TO RELATED APPLICATIONS

This application is a continuation application of PCT/CN2015/070808, filed on Jan. 15, 2015. The contents of PCT/CN2015/070808 are all hereby incorporated by reference.

BACKGROUND

Technical Field

The present application relates to a switch mode power supply, and in particular, to an alternating current (AC)-direct current (DC) conversion circuit and a control method thereof.

Related Art

A single-stage power factor (Power Factor, PF for short) corrector in the soft switching technologies, active clamping flyback, and active clamping forward, and improvement solutions thereof are widely used in power supplies. U.S. Pat. No. 7,301,785 B2 discloses a switching power supply circuit, and a voltage stress of a primary side switching transistor of the transformer circuit changes with the state of load and shifts to an excessively high voltage stress when the state is full load. U.S. Pat. No. 7,301,785 B2 fails to fundamentally overcome disadvantages of typical resonance technologies. Therefore, an available power range and input and output voltage ranges are limited. Chinese patent CN101692595B discloses an active clamping forward-flyback circuit. Upon comparison, the circuit is improved on the basis of other disclosed circuits. However, for the requirements of AC rectification and filtering, although a first secondary side of the circuit may not need a large-capacity electrolytic capacitor, the secondary side still needs an additional high-frequency filter capacitor in practical applications. An AC input side also needs to use a full bridge rectifier. A second secondary side rectifier circuit is complex. In an input rectifier loop or an output rectifier loop, a loss of a plurality of series-connected diodes is relatively large. Meanwhile, when the circuit does not include a large-capacity electrolytic capacitor, output voltage and current waves are both large. In practical applications, the circuit can be hardly applied to a scenario of an AC-DC conversion circuit with large power, and it is relatively appropriate to apply the circuit to a scenario of DC-DC conversion. Besides, when an AC is input to the transformer, a periodic change of an input voltage causes a change of a corresponding drive duty factor. Therefore, a loss of a clamping circuit increases in a low voltage input part increases due to the reason that a resonance condition is not met, and the stability and reliability of the circuit are reduced.

SUMMARY

The technical problem the present application attempts to solve is to eliminate the aforementioned disadvantages of the prior art, and to provide an AC-DC conversion circuit and a control method thereof.

To achieve the foregoing objective, the present application adopts the following technical solutions:

An AC-DC conversion circuit includes: an input rectifier circuit, a primary side input filtering capacitor, a primary side inverter circuit, a drive circuit, an isolation transformer, a secondary side rectifier circuit, a third and a fourth secondary side capacitors, a secondary side output filtering capacitor, and a control circuit connected between the secondary side output filtering capacitor and the drive circuit, where the drive circuit is connected to the primary side inverter circuit;

the input rectifier circuit includes a first and a second input rectifier diodes; an anode of the first input rectifier diode and a cathode of the second input rectifier diode are connected to an AC input live line; the primary side input filtering capacitor includes two high-frequency input filtering capacitors that are connected in series by using an AC input neutral wire as a middle point; opposite ends of each of the two high-frequency input filtering capacitors are separately connected to a positive end and a negative end of the input rectifier circuit;

the primary side inverter circuit includes a first and a second inverter switching transistors; the first inverter switching transistor and the second inverter switching transistor are separately connected to the positive end and the negative end of the input rectifier circuit; one end of a primary side winding of the isolation transformer is connected to the first and the second inverter switching transistors in series; the other end of the primary side winding of the isolation transformer is connected to the input neutral wire; the primary side inverter circuit and the primary side input filtering capacitor also form a loop, so as to form a clamping resonant circuit; the inverter switching transistors work at a zero voltage switching (ZVS) state;

the secondary side rectifier circuit includes a third and a fourth diodes; a cathode of the third diode is connected to an anode of the fourth diode and an output end of the secondary side winding of the isolation transformer; a cathode of the fourth diode is connected to a positive output end of a power supply and one end of the secondary side output filtering capacitor; an anode of the third diode is connected to a negative output end of the power supply and the other end of the secondary side output filtering capacitor; the other output end of the secondary side winding of the isolation transformer is connected to the middle point of the third and the fourth secondary side capacitors; the third secondary side capacitor is connected to the positive output end of the power supply; the fourth secondary side capacitor is connected to the negative output end of the power supply; and the secondary side rectifier circuit has two operation modes including a forward operation mode and a flyback operation mode.

Further, the isolation transformer is an isolation transformer whose magnetic core is provided with an air gap, or is an isolation transformer whose primary side is provided with a series-connected resonant inductor, or an isolation transformer whose secondary side is provided with a series-connected power inductor.

Further, the isolation transformer is a transformer with a single secondary side winding used as a forward operating coil as well as a flyback operating coil.

Further, the third and the fourth secondary side capacitors are two series-connected non-polar capacitors or polar capacitors; and in a case of polar capacitors, a positive pole of the third secondary side capacitor is connected to the positive output end of the power supply, and a negative pole of the fourth secondary side capacitor is connected to the negative output end of the power supply.

An AC-DC conversion circuit includes two, three, or more AC-DC conversion circuits described as above, and inputs of the AC-DC conversion circuits are connected to different phase inputs of AC sources with two, three, or more phase inputs.

Further, the AC sources have input neutral wires, and the middle points of the primary side input filtering capacitors of the AC-DC conversion circuits are connected to the input neutral wires, or the AC sources have no input neutral wires, and the middle points of the primary side input filtering capacitors of the AC-DC conversion circuits are connected to a same point.

A control method of the AC-DC conversion circuit is provided, where the circuit has two operation modes including a forward operation mode and a flyback operation mode; each of the first and the second inverter switching transistors in the circuit is used as an inverter switching transistor or a clamping switching transistor according to an operation period; when one switching transistor of the first and the second inverter switching transistors operates in an inverting state, the other switching transistor operates in a clamping operation state; the primary side input filtering capacitor in the circuit is used as an input filtering capacitor or a clamping capacitor according to an operation period; and the primary side input filtering capacitor resonates with leakage inductance of the isolation transformer in the circuit when the first or the second inverter switching transistor is switched off, so as to enable the clamping switching transistor and the inverter switching transistor to achieve ZVS, and energy of the leakage inductance of the isolation transformer is transferred to a secondary side of the isolation transformer by means of resonance.

Further, the operation states of the first and the second inverter switching transistors are controlled by using a control circuit, so as to enable a fundamental wave of an input current to be consistent with a fundamental wave of an input voltage.

Further, the clamping resonant circuit in the circuit adopts the following two control manners during a full cycle of AC rectification: skipping sending a drive signal in a low voltage phase that a voltage is less than a preset voltage threshold, and sending a drive signal in a high voltage phase that the voltage is greater than the set voltage threshold, so as to perform reverse resonance of a clamping current.

Beneficial Technical Effects of the Present Application:

The present application provides an AC-DC conversion circuit with single-phase or multiphase AC input and a wide range of single-stage high power factor. In the AC-DC conversion circuit of the present application, the input filtering capacitor implements an input filtering function as well as a clamping function, so as to assist the implementation of the soft switching operation of the primary side inverter switching transistor. The inverter switching transistor functions as an inverter switch as well as a clamping switch. That is, the circuit of the present application can sufficiently use the difference of operation states of switches in positive and negative half cycles of the AC input, multiplexes a negative (positive) end inverter switching transistor and a negative (positive) end input filtering capacitor, and implements functions of a clamping switching transistor and a clamping capacitor, which is similar to the three-level rectification technology, so as to reduce a diode loss in a rectifier loop. The primary side input filtering capacitor resonates with leakage inductance of the isolation transformer when the first or the second inverter switching transistor is switched off, so as to enable the clamping switching transistor and the inverter switching transistor to achieve ZVS, and energy of the leakage inductance of the high-frequency isolation transformer is transferred to a secondary side by means of resonance, so as to avoid an energy loss of the leakage inductance and avoid a sudden voltage spike of the inverter switching transistor.

With the present application, a diode loss of a rectifier loop is reduced, the soft switching of the positive (negative) end inverter switching transistors is implemented, and voltage stresses and switching losses of primary side switching transistors and secondary side rectifier diodes are reduced. Meanwhile, a voltage doubler rectifier of the secondary side is used, so as to reduce the voltage stresses of the secondary side rectifier diodes as well as form different loops of forward energy and flyback energy, thereby ingeniously implementing energy transfer similar to common power factor correction. That is, an output voltage is the addition of a proportional input voltage (the forward energy) and a proportional voltage of energy stored in an inductor (the flyback energy).

Besides, by means of multi-state clamping control modes, the clamping circuit adopts two control operation modes during a full cycle of AC rectification, that is, skipping sending a drive signal in a low input voltage phase, and sending a drive signal in a relatively high voltage phase, so as to perform reverse resonance of a clamping current, effectively control a loss of the clamping circuit, and improve the reliability of stability of the circuit.

The present application is particularly applicable to a scenario in which a three-phase or multiphase AC is input, an output voltage is relatively high, and a semiconductor device cannot bear a high voltage, and to a scenario in which the power factor, the power density, and the volume are strictly limited.

DETAILED DESCRIPTION

The embodiments of the present application are described below in detail with reference to the accompanying drawings. It should be stressed that the following descriptions are only exemplary, and are not intended to limit the scope and applications of the present application.

Embodiment 1

Figure 1:
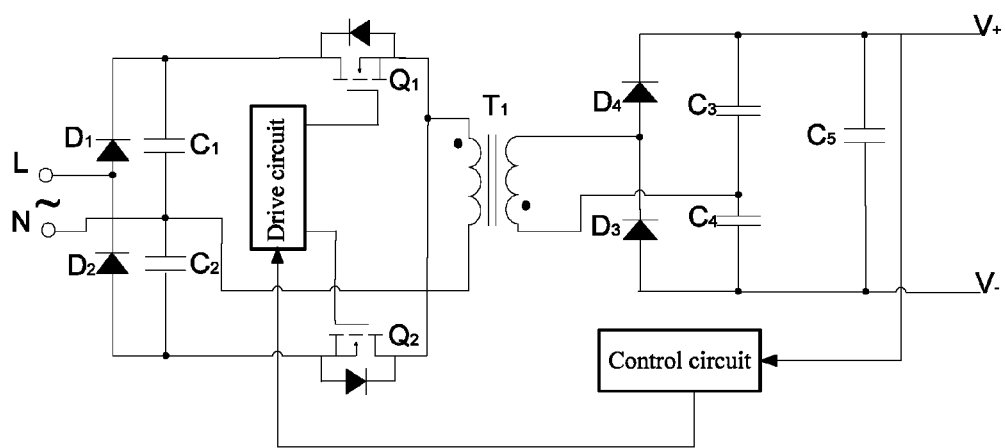
FIG. 1 is a circuit diagram of embodiment 1 of an alternating current (AC)-direct current (DC) conversion circuit according to the present application.

An AC-DC conversion circuit, as show in FIG. 1, includes: an input rectifier circuit, primary side input filtering capacitors C1 and C2, a primary side inverter circuit, a drive circuit, a high-frequency isolation transformer T1, a secondary side rectifier circuit, a third and a fourth secondary side capacitors C3 and C4, a secondary side output filtering capacitor C5, and a control circuit connected between the secondary side output filtering capacitor C5 and the drive circuit.

The input rectifier circuit includes two input rectifier diodes D1 and D2; an anode of the input rectifier diode D1 and a cathode of the input rectifier diode D2 are connected to an AC input live line L; the primary side input filtering capacitors include two high-frequency input filtering capacitors C1 and C2 that are connected in series by using an AC input neutral wire N as a middle point; and opposite ends of each of the two high-frequency input filtering capacitors C1 and C2 are separately connected to a positive end and a negative end of the input rectifier circuit.

The primary side inverter circuit includes a first and a second inverter switching transistors Q1 and Q2; the first and the second inverter switching transistors Q1 and Q2 are separately connected to the positive end and the negative end of the input rectifier circuit; one end of a primary side winding of the isolation transformer T1 is connected to the first and the second inverter switching transistors Q1 and Q2 in series; the other end of the primary side winding of the isolation transformer T1 is connected to the AC input neutral wire N; the primary side inverter circuit and the primary side input filtering capacitors C1 and C2 also form a loop, so as to form a clamping resonant circuit; and the inverter switching transistors Q1 and Q2 work at a ZVS state. By means of the control of gate voltages of the inverter switching transistors Q1 and Q2, a direct voltage may be converted into a pulse voltage, and the pulse voltage is applied to the primary side winding of the isolation transformer. By means of the control of a switching transistor, performing a clamping function, in the inverter switching transistors Q1 and Q2, the continuity of a resonant current reverse loop may be controlled.

The secondary side rectifier circuit includes a forward operation rectifier loop and a flyback operation rectifier loop, and includes a third diode D3 and a fourth diode D4; a cathode of the third diode D3 is connected to an anode of the fourth diode D4 and an output end of the secondary side winding of the isolation transformer; a cathode of the fourth diode D4 is connected to a positive output end V+ of a power supply and one end of the secondary side output filtering capacitor C5; an anode of the third diode D3 is connected to a negative output end V− of the power supply and the other end of the secondary side output filtering capacitor C5; the other output end of the secondary side winding of the isolation transformer is connected to the middle point of the third and the fourth secondary side capacitors C3 and C4; a positive pole of the third secondary side capacitor C3 (when a polar capacitor is adopted) is connected to the positive output end V+ of the power supply; a negative pole of the fourth secondary side capacitor C4 (when a polar capacitor is adopted) is connected to the negative output end of the power supply. Alternatively, the third and the fourth secondary side capacitors C3 and C4 may adopt non-polar capacitors.

According to circuit connection principles, voltages applied to a capacitor in the forward operation loop and a capacitor in the flyback operation loop have waves that are identical to or complementary to waves after an input AC is rectified, and there is an approximately linear relationship between a change of the voltage of the capacitor in the forward operation loop and a change of an input voltage of a primary side.

The operation states of the first and the second inverter switching transistors are controlled by using the control circuit, so as to enable a fundamental wave of an input current to be consistent with a fundamental wave of an input voltage, thereby implementing high input power factor correction.

The input circuit is used to rectify an AC voltage. Therefore, the capacities of the high-frequency input filtering capacitors C1 and C2 are not great, and parameters of the high-frequency input filtering capacitors C1 and C2 are mainly decided by a resonant frequency for clamping. Therefore, the present circuit ensures that an input current may conditionally follow an input voltage, so as to ensure the input power factor and total harmonics distortion (Total Harmonics Distortion, THD for short) of a power supply.

When an AC is input, in a positive (negative) half cycle (the contents in the brackets below correspond to the AC negative half cycle), rectification is performed by using an input rectifier diode D1 (D2), and then the primary side input filtering capacitor C1 (C2) performs high-frequency filtering. The inverter circuit is formed by the inverter switching transistor Q1 (Q2) and the isolation transformer T1. At this time, the primary side clamping resonant circuit is formed by the clamping capacitor C2 (C1), the clamping switching transistor Q2 (Q1), and the primary side winding of the transformer. In an operation cycle, according to a result calculated by the control circuit, a high-frequency PWM signal is applied to the inverter switching transistor Q1 via the drive circuit; a drive voltage applied to the clamping switching transistor Q2 is a PWM voltage approximately complementary to that of Q1; and a particular dead time delay exists between the two PWM drive voltages.

The isolation transformer is an isolation transformer whose magnetic core is provided with an air gap, or is an isolation transformer whose primary side is provided with a series-connected resonant inductor, or an isolation transformer whose secondary side is provided with a series-connected power inductor. The size of the air gap of the magnetic core is determined by a ratio of forward to flyback, together with system input and output parameters. Coupling coefficients of the primary side and the secondary side do not need to be specifically set.

The magnetic core of the isolation transformer T1 is provided with the air gap, and the isolation transformer T1 has leakage inductance, so that the isolation transformer T1 may operate at two states, a forward state and a flyback state. The leakage inductance may be obtained by using a natural winding process. Moreover, according actual requirements, large or small leakage inductance may be obtained by changing the winding process. Certainly, if the leakage inductance obtained from natural winding is not enough, an inductor may be added to the secondary side.

The isolation transformer do not need to deliberately distinguish a connection point of end points of the primary side and the secondary side, and do not need to deliberately consider a starting end of the isolation transformer.

Figure 2:
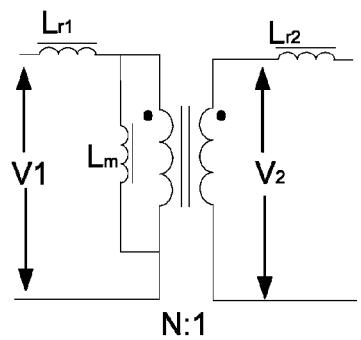
FIG. 2 is a schematic diagram of an equivalent structure of a transformer in the circuit shown in FIG. 1.

Referring to FIG. 2, when the isolation transformer T1 is wound, the main excitation inductor Lm and the leakage inductance Lr of the primary side are set. The leakage inductance of the primary side and the resonant frequency of the resonant capacitor C2 (C1) with respect to the switching frequency meet the following formula:

$$\pi\sqrt{L_r C_{clamp}} > T_{off}(T_{off} \cong [1-D]T_s, C_{clamp}=C2);$$

Relevant operation loops and principles are as follows:

When an AC is input, the positive half cycle and the negative half cycle are symmetrical. Therefore, the positive half cycle of the AC input is used as an example below.

State One:

In the positive half cycle, rectification is performed by using the diode D1, and then the capacitor C1 performs high-frequency filtering. In the operation cycle, the control circuit calculates a result according to a feedback of an input voltage, and a high-frequency PWM signal is applied to the inverter switching transistor Q1 by using the drive circuit.

When the inverter switching transistor Q1 is switched on, the excitation inductor Lm and the resonant inductor Lr1 of the primary side of the transformer start linear charging. When a current of the primary side is equal to an excitation current, and a voltage V2 coupled by the secondary side rises to VLr2+V C4, the diode D4 is conducted, that is, the voltage V2 is clamped; the current of the secondary side is I2; and the current of the primary side is approximately ILr=ILm+I2/n. To the output rectifier loop, this state is the same as a normal forward operation. Moreover, an input voltage to be rectified is of a sine-shaped wave, and the capacity of the high-frequency input filtering capacitor is relatively small. Therefore, a wave of a voltage of the capacitor C4 is also approximately sine-shaped, and is in an approximate 1/n linear relationship with an input voltage Vin.

State Two:

When the inverter switching transistor Q1 is switched off, a parasitic capacitor of the inverter switching transistor Q1 is charged. The charging process is resonant, and may be regarded as linear because the parasitic capacitor is relatively small and the charting time is very short. Meanwhile, the secondary leakage inductance or the electric potential VLr2 of an external inductor Lr2 is deflected, so as to try to maintain an original current direction and size unchanged. However, as the time passes, the current passing through the inductor or the reflector diode D4 necessarily starts to fall.

State Three:

When the parasitic capacitor of the inverter switching transistor Q1 is charged to a voltage high enough, approximately a voltage of VC2+Vin, the clamping switching transistor Q2 may be anti-parallel connected to a diode, so that the diode is forward-biased and conducted. The clamping capacitor C2 clamps the voltages of the resonant inductor Lr1 and the excitation inductor Lm to the voltage VC2. The clamping capacitor C2 is excessively larger than the parasitic capacitor of the inverter switching transistor Q1, and therefore, most of the resonant current enters the clamping capacitor C2, and the clamping capacitor C2 starts resonating with the resonant inductor Lr1. When the current of the primary side is equal to the excitation current, an output current of the secondary side of the transformer is zero, and the electric potential of a coupling voltage V2 of the secondary side changes in an alternating manner.

State Four:

When the voltage of the primary side falls to a voltage low enough, the coupling voltage V2 corresponding to the secondary side is enough to enable the diode D3 to be forward biased and conducted. At this time, a voltage reflected from the secondary side to the primary side is approximately n (Vo-Vc3-VLr2), so as to provide a condition for achieving, by the clamping switching transistor Q2, the ZVS. At this time, the clamping switching transistor Q2 is conducted because a drive voltage thereof changes to a high level. In the mode of this operation state, energy previously stored in the air gap of the transformer is released. This state is a typical flyback transformer operation. The voltage of the capacitor C4 is in a linear relationship with the input voltage. Therefore, the voltage of the capacitor C3 and the voltage of the capacitor C4 are combined in a complementary manner to form an output voltage.

State Five:

When the clamping switching transistor Q2 is switched off, the clamping capacitor C2 is compelled to depart from the original resonant loop, and the resonant inductor Lr1 and the parasitic capacitor of the inverter switching transistor Q1 form new resonance, so as to release charges of the parasitic capacitor, and prepare for the ZVC of the inverter switching transistor Q1.

State Six:

When a driver of the Q2 is off for a period of time, charges of the parasitic capacitor of the inverter switching transistor Q1 are completely released by means of the resonance in state five, and a current flows by means of a diode to which the inverter switching transistor Q1 is anti-parallel connected. At this time, the inverter switching transistor Q1 obtains a condition for the implementation of the ZVS.

State Seven

At this time, the inverter switching transistor Q1 is conducted because a drive voltage thereof is changed to a high level; the inductor of the primary side is subjected to linear charging. A new cycle is started, and the foregoing state processes are repeated.

Figure 3:
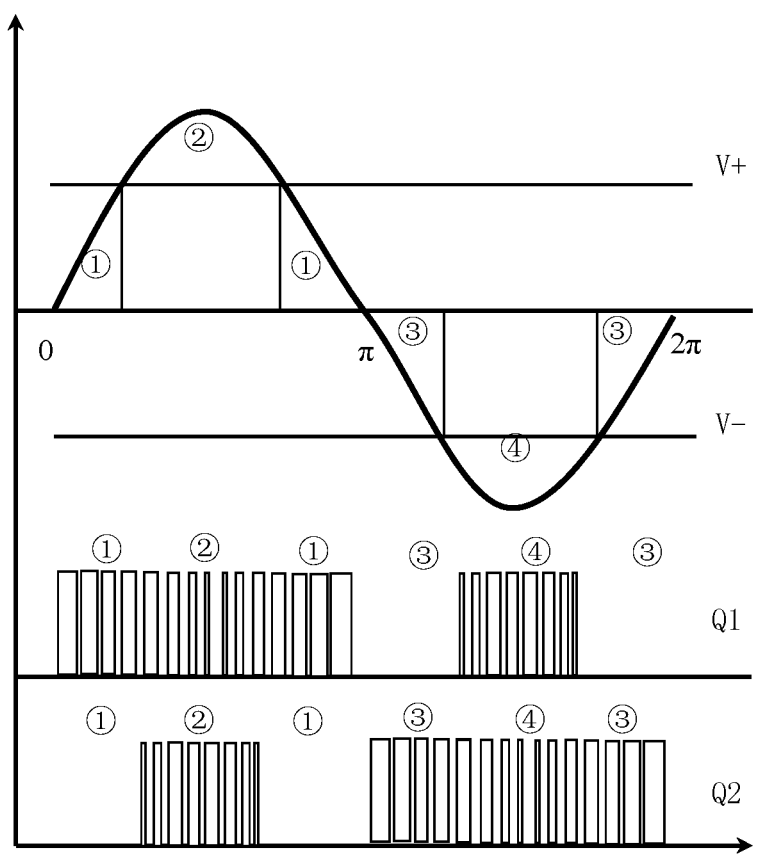
FIG. 3 is a drive timing diagram of switching transistors in the circuit shown in FIG. 1.

As shown in FIG. 3, FIG. 3 is a drive timing diagram of switching transistors in the circuit according to the present application. In this circuit, when the input voltage is in the range ① and range ③, the duty ratios of the inverter switching transistors are relatively large; and during the period that the inverter switching transistors are off, the aforementioned resonant current has no time to be reversed because the period is relatively short. Meanwhile, the input voltage is relatively low, and a voltage stress of a semiconductor element in the circuit is relatively small. To avoid the cause of uncertainty of a resonant state and unreliability of the circuit, preferably, limits of the input voltage in the range ① and range ③ are set, and the driver of the clamping switching transistor is off for a long time, so as to enable the clamping capacitor to perform a common spike absorption function, and reduce a driving loss. When the input voltage is in the range ② and range ④, the clamping switching transistor Q2 (or Q1) operates according to the foregoing clamping method, thereby effectively improving the stability and reliability of the circuit.

It can be known from the foregoing state one to state four in the operation modes that, in the AC-DC conversion circuit, the isolation transformer is like a linear transformer; a linear proportional decrease in the input voltage is input to the capacitor C4; and the isolation transformer is like a PFC inductor in a common power factor correction circuit, so that energy stored when the switching transistors are conducted is released to the capacitor C3 when the switching transistors are switched off. Therefore, the voltages of the capacitors C3 and C4 form a linear proportional and conventionally non-isolated PFC voltage. Therefore, the circuit achieves the isolated PFC in a sound manner, which is an advantage that the known single-stage isolated AC-DC conversion circuit lacks.

When the input voltage is in the negative half cycle of the AC, rectification is performed by using the diode D2, and then the capacitor C2 performs high-frequency input filtering. The inverter circuit is formed by the inverter switching transistor Q2 and the primary side winding of the isolation transformer T1, and at this time, the primary side clamping resonant circuit is formed by the clamping capacitor C1, the clamping switching transistor Q1, and the primary side winding of the transformer. Meanwhile, the voltage waves of the capacitors C3 and C4 are symmetrically changed. The capacitor C3 functions as the output capacitor of the forward loop, and C4 functions as the output capacitor of the flyback loop. The other operation state principles and the control methods are consistent with those of the foregoing positive half wave.

It can be known from the foregoing analysis that, in this circuit, the primary side inverter switching transistors and the high-frequency filtering capacitors are ingeniously used as clamping switching transistors and clamping capacitors in positive and negative half cycles of the input voltage; the input rectifier loop only includes one diode; and the output rectifier loop also only includes one diode. Therefore, the wires of this circuit are simple and highly-efficient.

Embodiment 2

Figure 4:
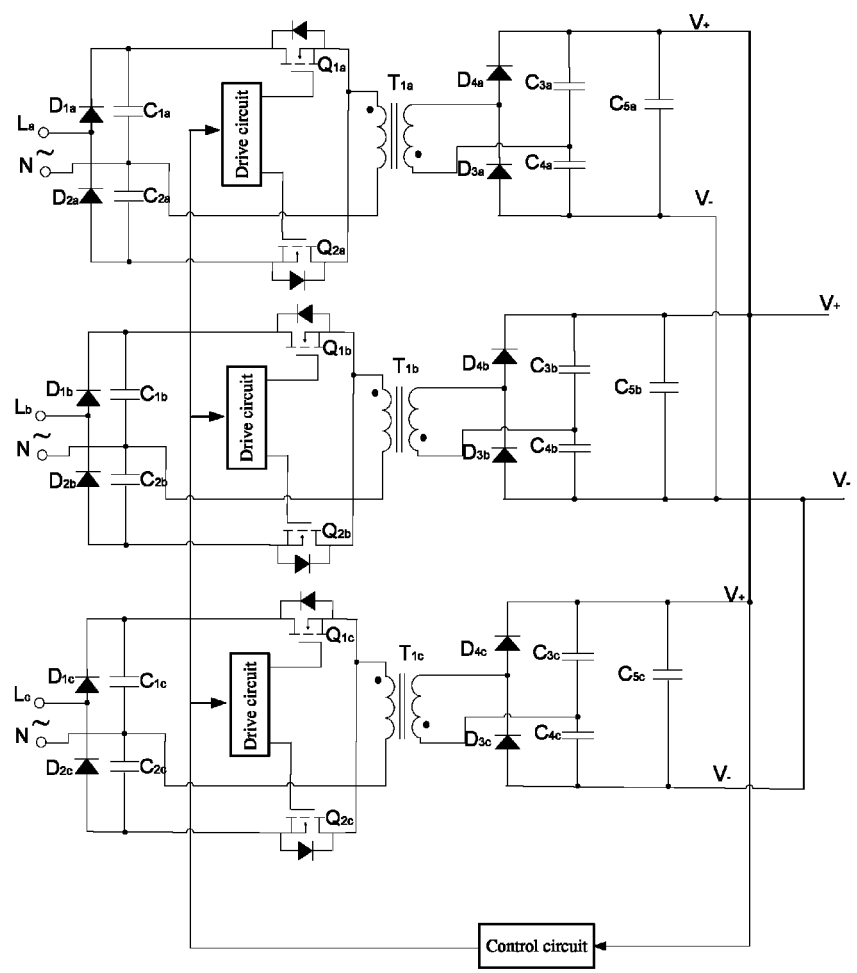
FIG. 4 is a circuit diagram of embodiment 2 of a AC-DC conversion circuit according to the present application.

The present application further provides a two-phase, three-phase, or multiphase input AC-DC conversion circuit. FIG. 4 illustrates a three-phase four-wire input AC-DC conversion circuit whose basic circuit compositions and beneficial effects are the same as those of embodiment 1. The three-phase four-wire input AC-DC conversion circuit of embodiment 2 differs from the AC-DC conversion circuit of embodiment 1 in that: the input is three-phase. Advantages of the three-phase four-wire input AC-DC conversion circuit of embodiment 2 are that: theoretically, an output voltage with properties better than those of the output voltage of embodiment 1 is obtained, the output voltage is smoother, and a ripple voltage is smaller. In FIG. 4, $D1a$, $D2a$, $D1b$, $D2b$, $D1c$, and $D2c$ represent primary side rectifier diodes; $C1a$, $C2a$, $C1b$, $C2b$, $C1c$, and $C2c$ represent primary side filtering capacitors; $Q1a$, $Q2a$, $Q1b$, $Q2b$, $Q1c$, and $Q2c$ represent primary side inverter switching transistors; $T1a$, $T1b$, and $T1c$ represent transformers; $D3a$, $D4a$, $D3b$, $D4b$, $D3c$, and $D4c$ represent secondary side rectifier diodes; and $C3a$, $C4a$, $C5b$, $C3b$, $C4b$, $C5b$, $C3c$, $C4c$, and $C5c$ represent secondary side filtering capacitors.

Embodiment 3

Figure 5:
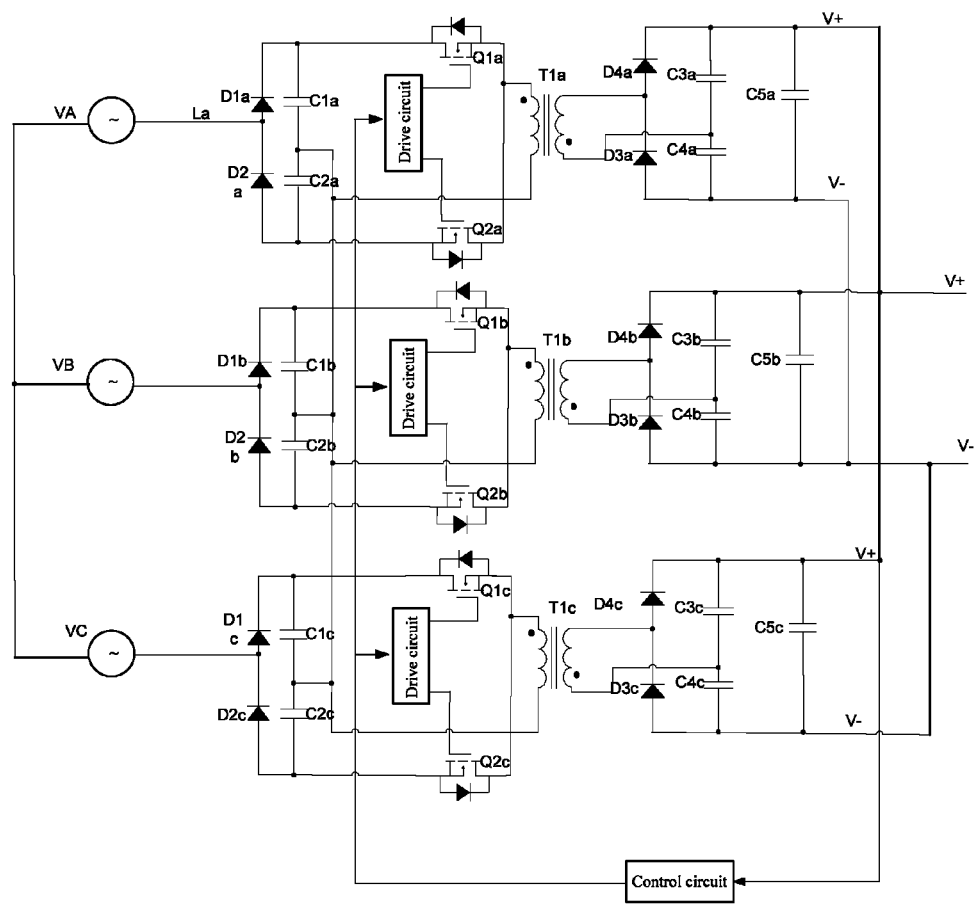
FIG. 5 is a circuit diagram of embodiment 3 of an AC-DC conversion circuit according to the present application.

The present application further provides a two-phase, three-phase, or multiphase input AC-DC conversion circuit. FIG. 5 illustrates a three-phase three-wire input AC-DC conversion circuit whose basic circuit compositions and beneficial effects are the same as those of embodiment 2. The three-phase three-wire input AC-DC conversion circuit of embodiment 3 differs from the three-phase four-wire input AC-DC conversion circuit of embodiment 2 in that: the input is input without a neutral wire. An advantage of the three-phase three-wire input AC-DC conversion circuit of embodiment 3 is that the foregoing properties may still be achieved in a practical application environment of three-phase three-wire input without a neutral wire.

When the circuit of the present application operates, there are two different operation modes including a forward operation mode and a flyback operation mode. Therefore, relatively large adjustment ranges of input and output voltages may be achieved, and an input current may follow an input voltage, so as to correct the power factor. Meanwhile, with the function of an active clamping circuit, reverse recovery voltage spikes and switching losses of the primary side switching transistors and the secondary side rectifier diodes caused by factors such as the leakage induction of the isolation transformer are reduced, and efficiency is improved. As compared with a conventional circuit, the circuit of the present application is simpler. Besides, by means of multi-state clamping control modes and methods, a loss of the clamping circuit is effectively controlled. The present application is suitable to be widely used in a scenario of three-phase (multiphase) AC input, and a scenario in which an output voltage is relatively high.

The foregoing contents are the detail descriptions of the present application with reference to specific exemplary implementation manners, and it should not be construed that the specific implementations of the present application are limited to the descriptions. A person of ordinary skill in the art may make several simple deductions and replacements without departing from the inventive concept of the present application, and the deductions and replacements shall be deemed to fall within the protection scope of the present application.

What is claimed is:

1. An alternating current (AC)-direct current (DC) conversion circuit, comprising: an input rectifier circuit, a primary side input filtering capacitor, a primary side inverter circuit, a drive circuit, an isolation transformer, a secondary side rectifier circuit, a third and a fourth secondary side capacitors, a secondary side output filtering capacitor, and a control circuit connected between the secondary side output filtering capacitor and the drive circuit, wherein the drive circuit is connected to the primary side inverter circuit;

wherein the input rectifier circuit comprises a first and a second input rectifier diodes; an anode of the first input rectifier diode and a cathode of the second input rectifier diode are connected to an AC input live line; the primary side input filtering capacitor comprises two high-frequency input filtering capacitors that are connected in series by using an AC input neutral wire as a middle point; opposite ends of each of the two high-frequency input filtering capacitors are separately connected to a positive end and a negative end of the input rectifier circuit;

wherein the primary side inverter circuit comprises a first and a second inverter switching transistors; the first inverter switching transistor and the second inverter switching transistor are separately connected to the positive end and the negative end of the input rectifier circuit; one end of a primary side winding of the isolation transformer is connected to the first and the second inverter switching transistors in series; the other end of the primary side winding of the isolation transformer is connected to the input neutral wire; the primary side inverter circuit and the primary side input filtering capacitor also form a loop, so as to form a clamping resonant circuit; the inverter switching transistors work at a zero voltage switching (ZVS) state;

wherein the secondary side rectifier circuit comprises a third and a fourth diodes; a cathode of the third diode is connected to an anode of the fourth diode and an output end of the secondary side winding of the isolation transformer; a cathode of the fourth diode is connected to a positive output end of a power supply and one end of the secondary side output filtering capacitor; an anode of the third diode is connected to a negative output end of the power supply and the other end of the secondary side output filtering capacitor; the other output end of the secondary side winding of the isolation transformer is connected to the middle point of the third and the fourth secondary side capacitors; the third secondary side capacitor is connected to the positive output end of the power supply; the fourth secondary side capacitor is connected to the negative output end of the power supply; and the secondary side rectifier circuit has two operation modes comprising a forward operation mode and a flyback operation mode.

2. The AC-DC conversion circuit according to claim 1, wherein the isolation transformer is an isolation transformer whose magnetic core is provided with an air gap, or is an isolation transformer whose primary side is provided with a series-connected resonant inductor, or an isolation transformer whose secondary side is provided with a series-connected power inductor.

3. The AC-DC conversion circuit according to claim 1, wherein the isolation transformer is a transformer with a single secondary side winding used as a forward operating coil as well as a flyback operating coil.

4. The AC-DC conversion circuit according to claim 1, wherein the third and the fourth secondary side capacitors are two series-connected non-polar capacitors or polar capacitors; and in a case of polar capacitors, a positive pole of the third secondary side capacitor is connected to the positive output end of the power supply, and a negative pole of the fourth secondary side capacitor is connected to the negative output end of the power supply.

5. An AC-DC conversion circuit, comprising: two, three, or more AC-DC conversion circuits according to claim 1, wherein inputs of the AC-DC conversion circuits are connected to different phase inputs of AC sources with two, three, or more phase inputs.

6. The AC-DC conversion circuit according to claim 5, wherein the AC sources have input neutral wires, and the middle points of the primary side input filtering capacitors of the AC-DC conversion circuits are connected to the input neutral wires, or the AC sources have no input neutral wires, and the middle points of the primary side input filtering capacitors of the AC-DC conversion circuits are connected to a same point.

7. A control method applied to the AC-DC conversion circuit according to claim 1, wherein
the circuit has two operation modes comprising a forward operation mode and a flyback operation mode; each of the first and the second inverter switching transistors in the circuit is used as an inverter switching transistor or a clamping switching transistor according to an operation period; when one switching transistor of the first and the second inverter switching transistors operates in an inverting state, the other switching transistor operates in a clamping operation state; the primary side input filtering capacitor in the circuit is used as an input filtering capacitor or a clamping capacitor according to an operation period; and the primary side input filtering capacitor resonates with leakage inductance of the isolation transformer in the circuit when the first or the second inverter switching transistor is switched off, so as to enable the clamping switching transistor and the inverter switching transistor to achieve ZVS, and energy of the leakage inductance of the isolation transformer is transferred to a secondary side of the isolation transformer by means of resonance.

8. The control method according to claim 7, wherein the operation states of the first and the second inverter switching transistors are controlled by using a control circuit, so as to enable a fundamental wave of an input current to be consistent with a fundamental wave of an input voltage.

9. The control method according to claim 7, wherein the clamping resonant circuit in the circuit adopts the following two control manners during a full cycle of AC rectification: skipping sending a drive signal in a low voltage phase that a voltage is less than a preset voltage threshold, and sending a drive signal in a high voltage phase that the voltage is greater than the set voltage threshold, so as to perform reverse resonance of a clamping current.

10. The control method according to claim 8, wherein the clamping resonant circuit in the circuit adopts the following two control manners during a full cycle of AC rectification: skipping sending a drive signal in a low voltage phase that a voltage is less than a preset voltage threshold, and sending a drive signal in a high voltage phase that the voltage is greater than the set voltage threshold, so as to perform reverse resonance of a clamping current.

* * * * *